United States Patent
Carberry et al.

(10) Patent No.: US 6,363,199 B1
(45) Date of Patent: Mar. 26, 2002

(54) EXTRACTION APPARATUS FOR A FIBER OPTIC CONNECTOR COMPONENT

(75) Inventors: John Carberry, Talbott; Michael L. Smith, Jefferson City, both of TN (US); Richard Racinskas, Coppell; Jeffrey Alan Humphries, Arlington, both of TX (US)

(73) Assignee: Neptec Optical Solutions, Inc., Knoxville, TN (US)

( * ) Notice: Subject to any disclaimer, the term of this patent is extended or adjusted under 35 U.S.C. 154(b) by 0 days.

(21) Appl. No.: 09/685,115

(22) Filed: Oct. 10, 2000

(51) Int. Cl.[7] ................................................ G02B 6/00
(52) U.S. Cl. ....................... 385/134; 385/53; 385/62; 385/81
(58) Field of Search ............................. 385/53, 55, 56, 385/58, 60, 62, 66, 70, 72, 81, 134, 136, 137, 139

(56) References Cited

U.S. PATENT DOCUMENTS 3,995,363 A * 12/1976 Medina, Jr. ................. 29/280
4,155,159 A * 5/1979 Hogan et al. ................ 29/764
5,214,735 A    5/1993 Henneberger et al.
5,881,191 A * 3/1999 Liberty ........................ 385/58
6,042,428 A * 3/2000 Espiritu et al. ............. 439/686
6,240,229 B1 * 5/2001 Roth ............................ 385/53
6,325,335 B1 * 12/2001 Harvey ..................... 248/27.1

* cited by examiner

Primary Examiner—Brian Healy
Assistant Examiner—Sarah U Song
(74) Attorney, Agent, or Firm—Pitts & Brittian, P.C.

(57) ABSTRACT

An extraction apparatus for being mounted on, and for selectively removing, a fiber optic connector component from a panel or a wall. The extraction apparatus includes a spring compression mechanism having a first compression member for selectively compressing a first retaining spring of the fiber optic connector component, a second compression member for selectively compressing a second retaining spring of the fiber optic connector component, and an actuator member for selectively moving the first and second compression members into contact with the first and second retaining springs such that the first and second retaining springs are compressed by the first and second compression members to permit removal of the connector component from the opening in the panel. The actuator member is disposed so as to extend through the opening in the panel as the connector component is positioned in the opening.

13 Claims, 4 Drawing Sheets

EXTRACTION APPARATUS FOR A FIBER OPTIC CONNECTOR COMPONENT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention relates to an extraction apparatus for a fiber optic cable connector. More specifically, the extraction apparatus of the present invention is intended to be secured to a panel-mounted fiber optic connector component, and facilitates the removal of the connector component from the panel.

2. Description of the Related Art

Fiber optic cables are commonly used for signal transmission, and in order to facilitate the use of such cables, various connectors are employed to connect, or join, pairs of fiber optic cables at control panel or housing walls. Such connectors typically include a first component which is mounted in an opening in the panel or wall, and which has a ferrule for receiving and supporting the end of a first cable. The connectors also typically include a second component which mates with the first component. The second component has a second ferrule for receiving and supporting the end of a second cable in alignment with the end of the first cable. The first connector component generally is provided with some means for releasably securing the first connector component in the panel or wall. One of the more popular panel-mounted connector components utilizes a pair of retaining springs which expand once the component has been inserted into the panel opening and prohibit the component from being removed from the opening absent selective compression of the retaining springs.

It has been recognized that where panel-mounted connectors are used, it is important that the cable ends, and ferrule end faces, be clean and smooth to insure efficient signal transmission. Accordingly, frequent disassembly and cleaning of the connectors and cable ends is desirable. Unfortunately, where panel-mounted connectors with retaining spring fastening means are used, the connectors cannot be removed for cleaning without accessing the interior of the housing in which the connectors are mounted since the retaining springs are secured on the interior side of the panel or housing wall. Thus, cleaning is made more difficult and time consuming. Accordingly, there has been a need for a mechanism which would allow the retaining springs of a panel-mounted connector component to be compressed without accessing the interior of the housing in which the connector component is mounted.

It is therefore an object of the present invention to provide an extraction apparatus for facilitating the removal of a panel-mounted fiber optic connector component from the panel or wall in which it is installed.

It is also an object of the present invention to provide an extraction apparatus for facilitating the removal of a panel-mounted fiber optic connector component without accessing the interior of the housing in which the connector component is installed.

Yet another object of the present invention to provide an apparatus for facilitating the removal of a panel-mounted fiber optic connector component which is inexpensive to manufacture.

Other objects and advantages over the prior art will become apparent to those skilled in the art upon reading the detailed description together with the drawings as described as follows.

BRIEF SUMMARY OF THE INVENTION

In accordance with the present invention there is provided an extraction apparatus for being mounted on a fiber optic connector component to facilitate the removal of the fiber optic connector component from a panel or wall. In this regard, a typical fiber optic connector component has a proximal end portion provided with first and second retaining springs for holding the fiber-optic connector component in an opening in a panel. The extraction apparatus of the present invention is provided with a spring compression mechanism including first and second compression members for selectively compressing the first and second retaining spring of the fiber optic connector component. When the first and second retaining springs have been compressed by the compression members, the retaining springs no longer serve to hold the connector component in the panel and the connector component can be removed. In order to selectively move the first and second compression members in to contact with the first and second retaining springs, such that the retaining springs are compressed, the extraction apparatus includes an actuator member. The actuator member is connected to the spring compression mechanism, and is disposed so as to extend through the opening in the panel as the connector component is positioned in the opening such that movement of the compression members can be accomplished from the exterior of the housing in which the connector component is mounted.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An extraction apparatus for a fiber optic connector component, constructed in accordance with the present invention, is illustrated generally at 10 in the figures. The apparatus 10 is designed to be installed on a panel-mounted connector component in order to facilitate the removal of such component without accessing the interior of the housing in which the connector component is installed.

Figure 2:
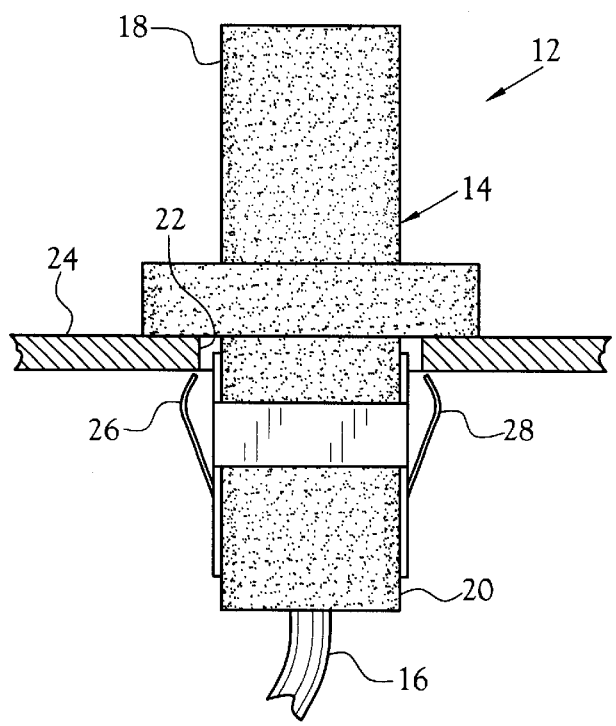
FIG. 2 is a top plan view of a prior art fiber optic connector component as it is mounted in an opening in a panel.
Figure 3:
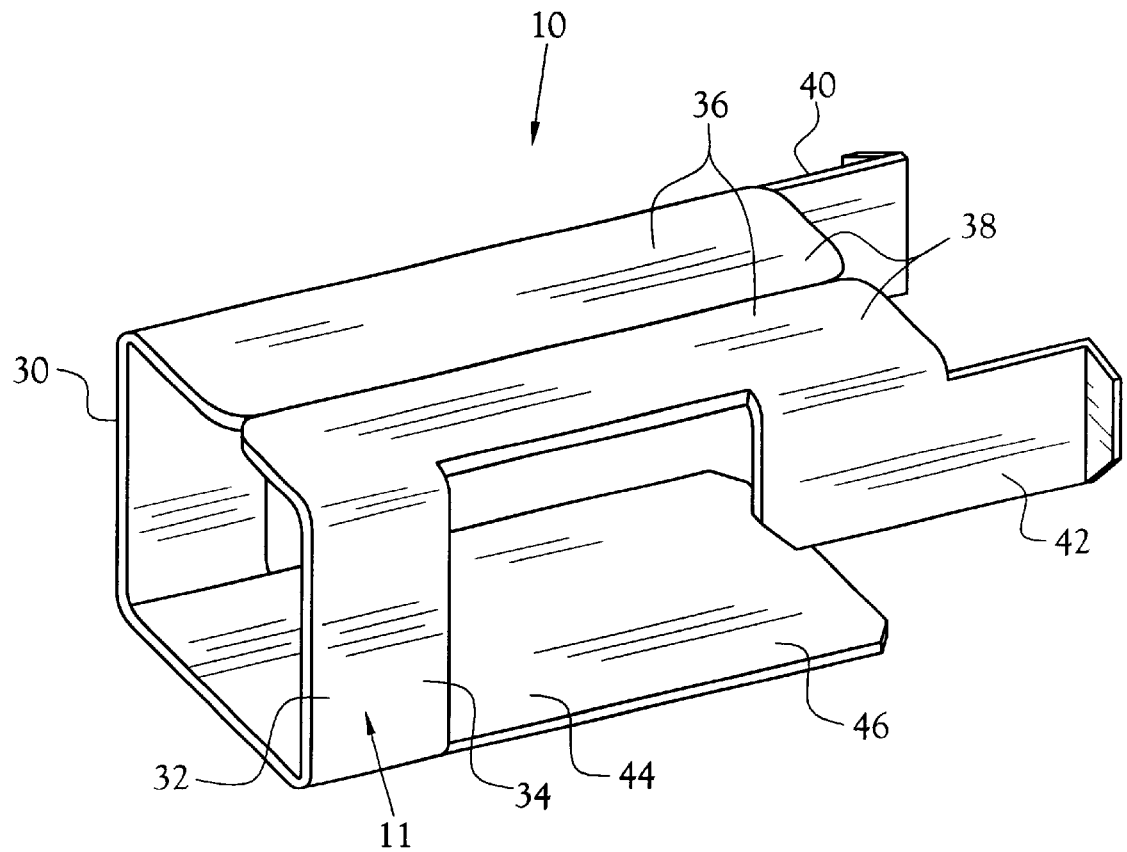
FIG. 3 is a perspective view of an extraction apparatus of the present invention

The extraction apparatus 10 includes a spring compression mechanism 11 which selectively compresses the retaining springs of a panel-mounted fiber optic connector component in order to allow the component to be removed from a panel. In this regard, a typical panel-mounted connector component, of the type on which the extraction apparatus 10 is mounted, is illustrated at 12 in FIG. 2. The connector component 12 comprises a body 14 housing a ferrule (not shown) for supporting the end of a first fiber optic cable 16. The connector component 12 also has a distal portion 18 capable of releasably engaging a second fiber optic connector component (not shown). It will be understood by those skilled in the art that the second connector component also houses a ferrule for supporting the end of a second fiber optic cable in alignment with the end of the first fiber optic cable 16 such that communication is established between the two cables. The body 14 of the connector component 12 also defines a proximal portion 20 which is received in an opening 22 of a panel 24. The proximal portion 20 is releasably secured in the opening 22 by a pair of oppositely disposed retaining springs 26 and 28 which expand after insertion of the proximal portion 20 into the opening 22. Accordingly, removal of the proximal portion 20 from the opening 22 requires that the retaining springs 26 and 28 be compressed to allow uninhibited movement of the proximal portion 20 out of the opening 22.

Figure 1:
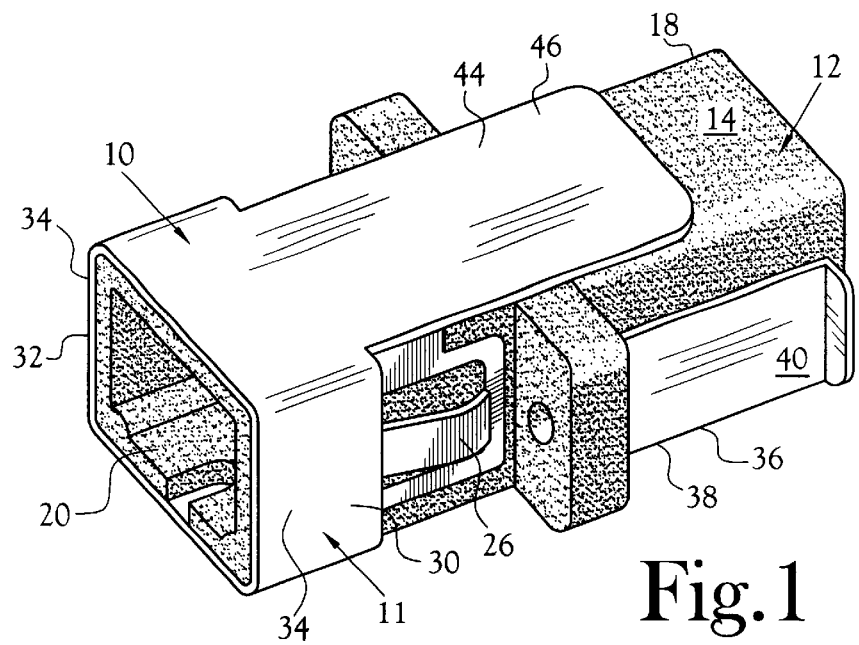
FIG. 1 is a perspective view of an extraction apparatus of the present invention as it is slidably received on a fiber optic cable connector component.

In the illustrated embodiment of the extraction apparatus 10 the spring compression mechanism 11 includes a first sliding compression member 30 and an oppositely disposes second sliding compression member 32. Each of the compression members 30 and 32 are movable from a first position where the members 30 and 32 are not in a position to compress the operatively associated retaining springs 26 and 28 (see FIGS. 1 and 4A) to a second position where the compression members 30 and 32 engage and compress the retaining springs 26 and 28. (See FIG. 4B) In the preferred embodiment the compression members 30 and 32 are defined by a sleeve 34 which is closely, and slidably, received about the proximal portion 20 of the connector component 12. However, it will be understood that utilizing the sleeve 34 to define the compression members 30 and 32 is merely one preferred construction.

Accordingly, it will be recognized that by slidably moving the sleeve 34 from the first position, where the compression members 30 and 32 are not compressing the retaining springs 26 and 28, to the second position where the members 30 and 32 overlay the retaining springs 26 and 28, the connector component 12 can be freed for withdrawal from the opening 22. In order allow selective movement of the compression members 30 and 32 from the first position to the second position, the extraction apparatus 10 includes at least one actuator member 36 which extends from the sleeve 34 toward the distal portion 18 of the connector component 12, such that the actuator member 36 defines a distal end portion 38 which is disposed outside of the opening 22 when the component 12 is mounted in the opening 22. Thus, it will be understood that selective movement of the actuator member 36 produces the desired sliding movement of the compression members 30 and 32.

In order to facilitate the movement of the actuator member 36 to produce sliding movement of the compression members 30 and 32 between the first and second positions, the actuator member 36 is preferably provided with at least one grasping structure. In the preferred illustrated embodiment a pair of oppositely disposed handle members 40 and 42 are provided proximate the distal end 38 of the actuator member 36 to facilitate the grasping and movement of the actuator member 36. It will, however, be understood that various alternative grasping structures or handles could be interchangeably used.

It is also noted that, in the preferred embodiment, the apparatus 10 is provided with a tab member 44 which extends from the sleeve 34 toward the forward portion 20 of the connector component 12, and which has a distal end portion 46 that extends out of the opening 22 when the component 12 is mounted in the opening 22. The tab member 44 facilitates the easy extraction of the connector component 12 from the opening 22 by eliminating the edge which would otherwise be defined by the sleeve 34 and which would potentially catch at the edge of the opening 22.

Figure 4A:
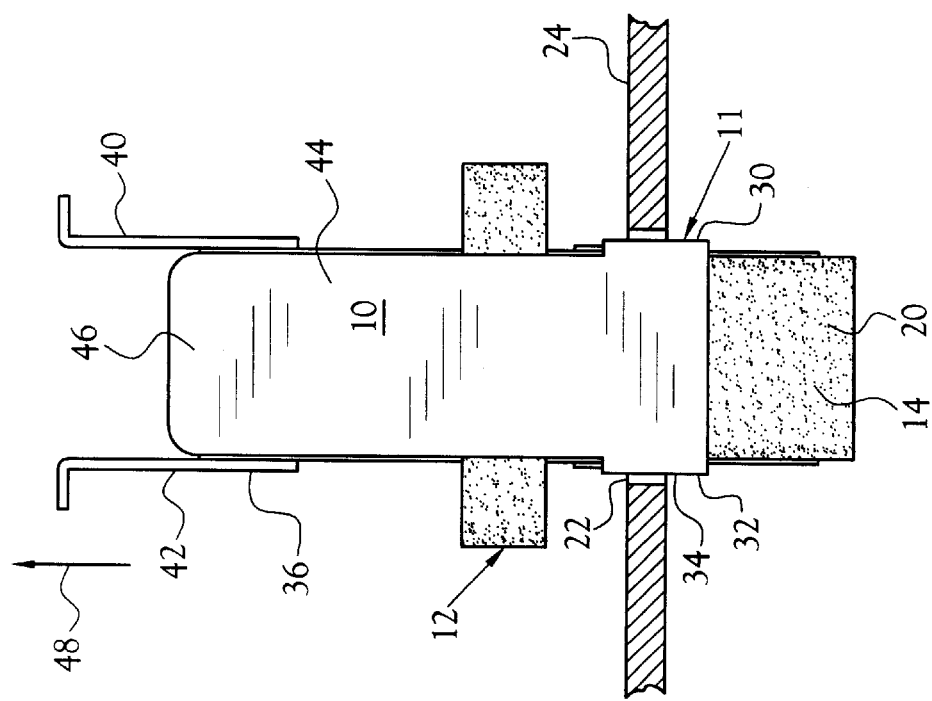
FIG. 4A is a top plan view of an extraction apparatus of the present invention as it is mounted on a fiber optic cable connector component which is installed in an opening in a panel.
Figure 4B:
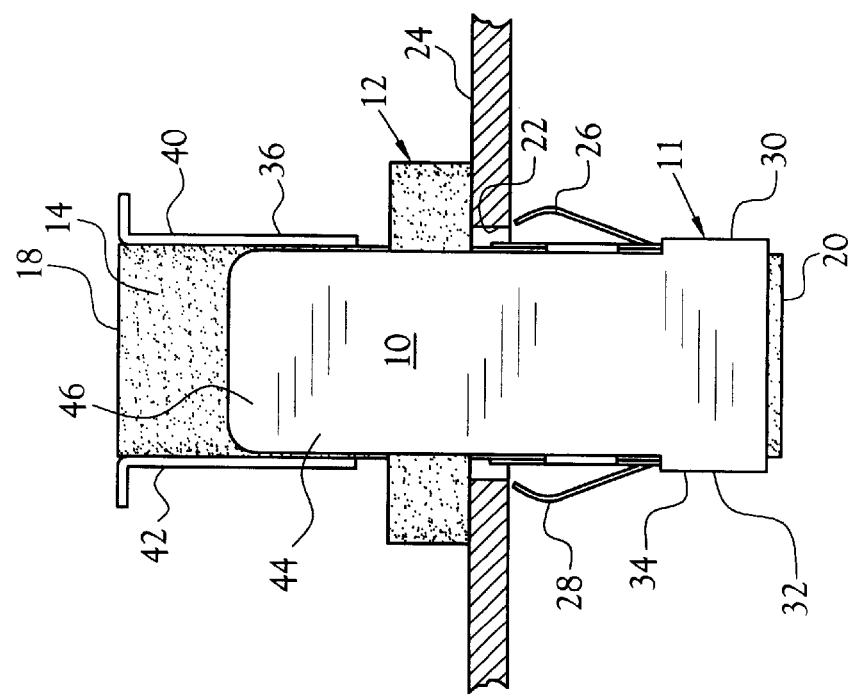
FIG. 4B is a top plan view of an extraction apparatus of the present invention as it is mounted on a fiber optic cable connector component which is being extracted from an opening in a panel.

In light of the above, it will be recognized that the extraction apparatus 10 is positioned on the connector component 12 prior to its insertion into the opening 22. After installation of the connector component 12, the apparatus 10 is maintained in the first position as illustrated in FIG. 4A such that the retaining springs 26 and 28 retain the connector component 12 in position on the panel 24. When removal of the connector component 12 is desired, the handle members 40 and 42 are used to move the actuator member 36 in the direction of arrow 48. As illustrated in FIG. 4B, such movement slides the compression members 30 and 32 over the retaining springs 26 and 28 such that they no longer serve to retain the connector component 12 in the opening 22, thereby allowing removal of the component 12.

Figure 5:
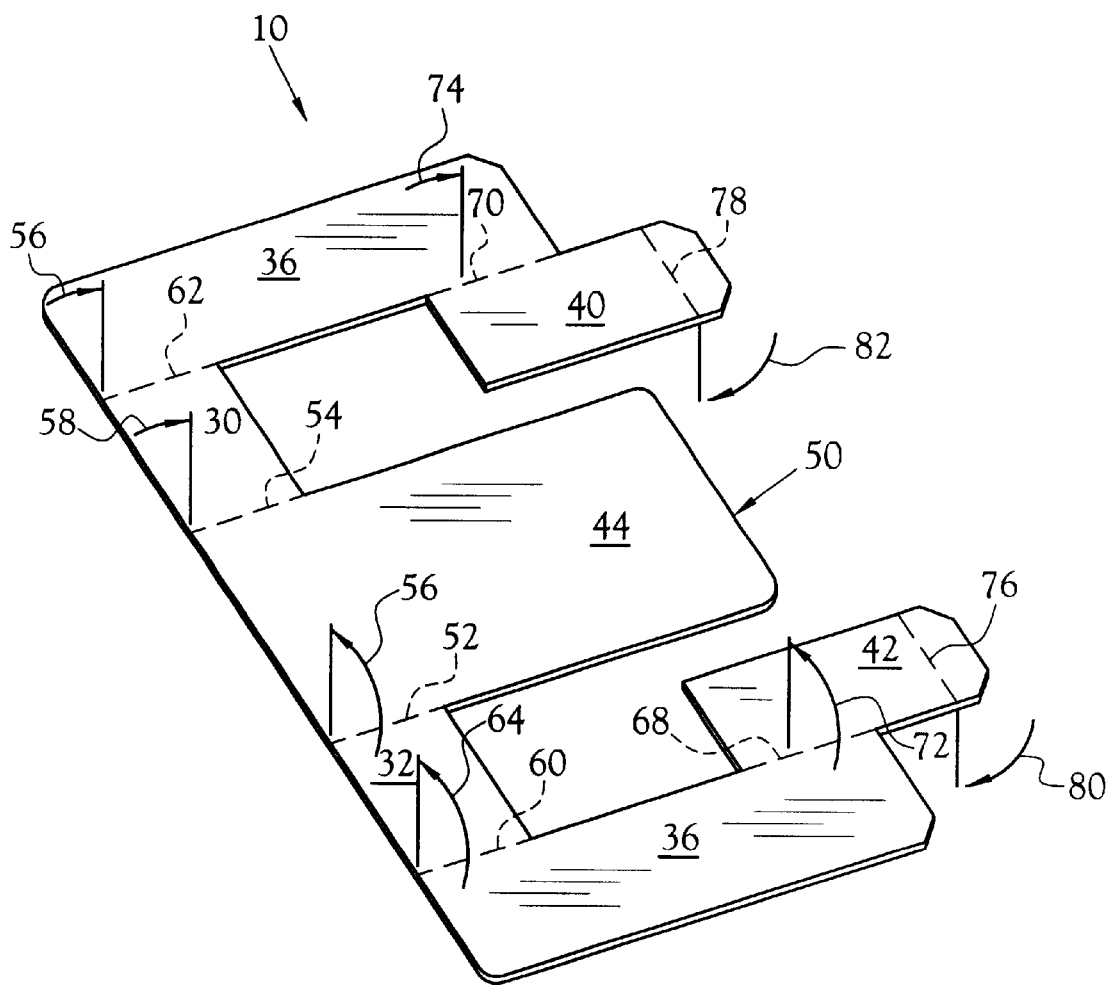
FIG. 5 is a perspective view of the body of an extraction apparatus of the present invention before it is formed into its final configuration.

In the preferred embodiment, the extraction apparatus 10 is fabricated from a single sheet of fabricating material such as a thin lightweight metal, and the various components of the apparatus are formed by selectively bending the sheet of fabricating material. As illustrated in FIG. 5, a substantially E-shaped body 50 is cut from a thin sheet of fabricating material. In order to form the sleeve 34 (with the actuator member 36 and the tab member 44 extending therefrom), bends of 90° are made in the body 50 at lines 52 and 54 in the direction of arrows 56 and 58, respectively. Bends of 90° are also made in the body 50 at lines 60 and 62 in the direction of arrows 64 and 66, respectively. In order to form the handle members 40 and 42, bends of 90° are made in the body 50 at lines 68 and 70 in the direction of arrows 72 and 74, respectively. Further, bends of 90° are made in the body 50 at lines 76 and 78 in the direction of arrows 80 and 82, respectively.

From the foregoing description, it will be recognized by those skilled in the art that an extraction apparatus for a fiber optic cable connector component offering advantages over the prior art has been provided. Specifically, the extraction apparatus 10 provides an efficient mechanism for removing connector components from a panel or wall without having to access the interior of the housing in which the connector components are mounted. Accordingly, removal of a connector component for repair, or to allow the cleaning of the connector component and the fiber optic cable ends associated therewith, is made much simpler. Moreover, it will be recognized that the preferred integral construction of the extraction apparatus 10 simplifies manufacture and greatly reduces manufacturing costs.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. An extraction apparatus for a fiber optic connector component, the fiber optic connector component having a proximal end portion provided with at least a first retaining spring for holding the fiber optic connector component in an opening in a panel, said extraction apparatus comprising:

a spring compression mechanism including at least a first compression member for selectively compressing the first retaining spring of the fiber optic connector component to allow the connector component to be removed from the opening in the panel; and an actuator member for selectively moving said compression member into contact with the first retaining spring, whereby the first retaining spring is compressed to permit removal of the connector component from the opening in the panel, said actuator member being disposed so as to extend through the opening in the panel as the connector component is mounted in the opening.

2. The extraction apparatus of claim 1, wherein said spring compression mechanism includes a second compression member for selectively compressing a second retaining spring carried by the fiber optic connector component to allow the connector component to be removed from the opening in the panel, and wherein said actuator member selectively moves said second compression member into contact with the second retaining spring, whereby the second retaining spring is compressed to permit removal of the connector component from the opening in the panel.

3. The extraction apparatus of claim 1 wherein said first compression member is selectively movable from a first position where said first compression member is not in a position to compress the first retaining spring to a second position where said first compression member engages and compresses the first retaining spring.

4. The extraction apparatus of claim 2 wherein said first compression member is selectively movable from a first position where said first compression member is not in a position to compress the first retaining spring to a second position where said first compression member engages and compresses the first retaining spring, and wherein said second compression member is selectively movable from a first position where said second compression member is not in a position to compress the second retaining spring to a second position where said second compression member engages and compresses the second retaining spring.

5. The extraction apparatus of claim 4 wherein said first and second compression members are defined by a sleeve which is closely and slidably received about the fiber optic connector component.

6. The extraction apparatus of claim 5 wherein said actuator member extends from said sleeve and through the opening in the panel when the fiber optic connector component is mounted in the opening in the panel such that said actuator member defines a distal end portion which is disposed on the opposite side of the panel from the sleeve as the fiber optic connector component is mounted in the opening in the panel.

7. An extraction apparatus for a fiber optic connector component, the fiber optic connector component having a proximal end portion provided with first and second retaining spring for holding the fiber optic connector component in an opening in a panel, said extraction apparatus comprising:

a spring compression mechanism including a first compression member for selectively compressing the first retaining spring of the fiber optic connector component and a second compression member for selectively compressing the second retaining spring of the filer optic connector component, whereby the first and second retaining springs no longer serve to hold the connector component in the panel; and an actuator member for selectively moving said first compression member into contact with the first retaining spring, and for moving said second compression member into contact with the second retaining spring, whereby the first and second retaining spring are compressed by said first and second compression members to permit removal of the connector component from the opening in the panel, said actuator member being disposed so as to extend through the opening in the panel as the connector component is positioned in the opening.

8. The extraction apparatus of claim 7 wherein said first compression member defines a first sliding panel member which is selectively movable from a first position where said first sliding panel member is not in a position to compress the first retaining spring to a second position where said first sliding panel member engages and compresses the first retaining spring, and wherein said second compression member defines a second sliding panel member which is selectively movable from a first position where said second sliding panel member is not in a position to compress the second retaining spring to a second position where said second sliding panel member engages and compresses the second retaining spring.

9. The extraction apparatus of claim 8 wherein said first and second sliding panel members are defined by a sleeve which is closely and slidably received about the fiber optic connector component.

10. The extraction apparatus of claim 9 wherein said actuator member extends from said sleeve and through the opening in the panel when the fiber optic connector component is mounted in the opening in the panel such that said actuator member defines a distal end portion which is disposed on the opposite side of the panel from the sleeve as the fiber optic connector component is mounted in the opening in the panel.

11. The extraction apparatus of claim 10 wherein said distal end portion of said actuator member is provided with at least one handle member for facilitating the manipulation of said actuator member.

12. The extraction apparatus of claim 7 wherein said extraction apparatus defines a body integrally formed from a thin sheet of fabricating material.

13. The extraction apparatus of claim 12 wherein said thin sheet of fabricating material defines a substantially E-shaped configuration.

* * * * *